United States Patent

Hamada et al.

Patent Number: 5,362,572
Date of Patent: Nov. 8, 1994

[54] TWO-LAYER THERMOPLASTIC ELASTOMER SHEET

[75] Inventors: Shunichi Hamada; Katsuyoshi Yonekura, both of Tokyo, Japan

[73] Assignee: Mitsui Petrochemical Industries, ltd., Tokyo, Japan

[21] Appl. No.: 20,164

[22] Filed: Feb. 19, 1993

Related U.S. Application Data

[63] Continuation-in-part of Ser. No. 806,220, Dec. 13, 1991, abandoned.

[30] Foreign Application Priority Data

Dec. 21, 1990 [JP] Japan ............................ 2-404883
Dec. 3, 1991 [JP] Japan ............................ 3-319373

[51] Int. Cl.$^5$ .................. B32B 9/04; B32B 27/08; C08L 23/10
[52] U.S. Cl. .................. 428/497; 428/516; 428/517; 428/519; 428/920; 525/237
[58] Field of Search .............. 428/516, 517, 519, 497, 428/920; 525/237

[56] References Cited

U.S. PATENT DOCUMENTS

3,572,721   3/1971   Harrison et al. .................. 525/237

FOREIGN PATENT DOCUMENTS

0229475   7/1987   European Pat. Off. .
0230114   7/1987   European Pat. Off. .
0276908   8/1988   European Pat. Off. .
61-222842  10/1986  Japan .
63-034138   2/1988   Japan .

Primary Examiner—P. C. Sluby
Attorney, Agent, or Firm—Sherman & Shalloway

[57] ABSTRACT

Disclosed is a two-layer thermoplastic elastomer sheet comprising a skin layer [I] and a reverse surface layer [II], each layer being composed of a thermoplastic elastomer containing a polyolefin resin (A) and an α-olefin copolymer rubber (B), wherein a difference [($I_B$)−($II_B$)] between the amount ($I_B$) of the α-olefin copolymer rubber (B) contained in the thermoplastic elastomer of the skin layer (I) and the amount ($II_B$) of the α-olefin copolymer rubber (B) contained in the thermoplastic elastomer of the reverse surface layer (II) is in the range of 5 to 85 parts by weight. The two-layer thermoplastic elastomer sheet of the invention is excellent in vacuum forming properties and can provide molded products excellent in the soft touch and having appearance of softness, appearance of flexibility and appearance of warmth. The sheet of the invention can be widely used for interior automotive trim such as an instrument panel.

17 Claims, No Drawings

TWO-LAYER THERMOPLASTIC ELASTOMER SHEET

This application is a continuation-in-part of application Ser. No. 07/806,220, filed Dec. 13, 1991; now abandoned.

FIELD OF THE INVENTION

The present invention relates to a two-layer thermoplastic elastomer sheet. More particularly, the invention relates to a two-layer thermoplastic elastomer sheet which is excellent in vacuum forming properties and can provide molded products having excellent soft texture.

BACKGROUND OF THE INVENTION

Polyvinyl chloride (PVC) resins have been heretofore widely used as materials for interior automotive trim. However, the automotive trim made of the polyvinyl chloride resins have problems in various properties such as heat resistance, low-temperature resistance, heat aging characteristics, light resistance, anti-fogging properties, odor development, lack of the soft texture and cheap-looking appearance. For this reason, polyolefin thermoplastic elastomers excellent in those properties are desired as replacements of the polyvinyl chloride resins.

When a partially crosslinked thermoplastic elastomer is used to produce a vacuum forming sheet, the vacuum forming properties of the sheet are inferior to vacuum forming sheets containing polyvinyl chloride resins. Therefore, it is necessary to either reduce the rubber content in the partially crosslinked thermoplastic elastomer or to use a polyolefin thermoplastic elastomer which is not crosslinked (hereinafter, it is sometimes referred as a non-crosslinked thermoplastic elastomer) in place of the partially crosslinked thermoplastic elastomer.

However, if a molded product is made of the partially crosslinked polyolefin thermoplastic elastomer having a low content of rubber by vacuum forming, the resulting product is rigid and lacks a soft texture (softness). If a molded product is made of the non-crosslinked thermoplastic elastomer by vacuum forming, the resulting product is insufficient in heat resistance, rubbery properties and toughness, and is too high in surface glossiness. Low surface gloss of the resulting products is preferable.

OBJECT OF THE INVENTION

The purpose of the present invention is to solve the above-mentioned problems existing in the prior arts, and it is a first object of the invention is to provide a two-layer thermoplastic elastomer sheet which is excellent in vacuum forming properties and can produce molded having an excellent soft texture. Further, it is a second object of the present invention to provide a two-layer thermoplastic elastomer sheet which is excellent in vacuum forming properties and can produce molded products having low surface glossiness.

SUMMARY OF THE INVENTION

The first two-layer thermoplastic elastomer sheet of the present invention comprises a skin layer [I] and a reverse surface layer [II], wherein:

the skin layer is composed of a thermoplastic elastomer containing a polyolefin resin (A) in an amount of 1 to 85 parts by weight and an α-olefin copolymer rubber (B) in an amount of 99 to 15 parts by weight, total amount of (A) and (B) being 100 parts by weight;

the reverse surface layer [II] is composed of a thermoplastic elastomer containing a polyolefin resin (A) in an amount of 6 to 90 parts by weight and an α-olefin copolymer rubber (B) in an amount of 94 to 10 parts by weight, total amount of (A) and (B) being 100 parts by weight; and a difference $[(I_B)-(II_B)]$ between the amount $(I_B)$ of the α-olefin copolymer rubber (B) contained in the thermoplastic elastomer of the skin layer (I) and the amount $(II_B)$ of the α-olefin copolymer rubber (B) contained in the thermoplastic elastomer of the reverse surface layer (II) is in the range of 5 to 85 parts by weight.

The second two-layer thermoplastic elastomer sheet of the present invention comprises a skin layer (I) and a reverse surface layer (II), wherein:

the skin layer (I) is formed of a partially crosslinked thermoplastic elastomer containing a polyolefin resin (A) in an amount of 10 to 60 parts by weight and an α-olefin copolymer rubber (B) in an amount of 90 to 40 parts by weight, the total amount of (A) and (B) being 100 parts by weight;

the reverse surface layer (II) thermoplastic elastomer containing a polyolefin resin (A) in an amount of 20 to 70 parts by weight and an α-olefin copolymer rubber (B) in an amount of 80 to 30 parts by weight, total amount of (A) and (B) being 100 parts by weight.

In a preferred embodiment of the second two-layer thermoplastic elastomer sheet of the present invention, the skin layer (I) includes 100 parts by weight of the partially crosslinked thermoplastic elastomer and 5 to 100 parts by weight of a polyolefin resin (E).

In each of the first and second two-layer thermoplastic elastomer sheets of the present invention, if a light stabilizer is added to the thermoplastic elastomer constituting the skin layer (I) and a flame-retardant is added to the thermoplastic elastomer constituting the reverse surface layer (II), there can be obtained a two-layer thermoplastic elastomer sheet capable of producing a molded product which is excellent in light resistance and flame-retardance and is free from occurrence of bleedout.

Also, the first and second thermoplastic elastomer sheets of the invention provide molded products having an excellent soft texture and sufficiently low surface glossiness in addition to excellent vacuum forming properties.

DETAILED DESCRIPTION OF THE INVENTION

The two-layer thermoplastic elastomer sheets of the present invention are concretely described below.

The first two-layer thermoplastic elastomer sheet of the invention comprises a skin layer [I] and a reverse surface layer [III], and these layers are composed of thermoplastic elastomers (TPE) of different kinds which differ in the amounts of a polyolefin resin (A) and an α-olefin copolymer rubber (B) contained therein.

The second two-layer thermoplastic elastomer sheet of the invention comprises a skin layer (I) containing a thermoplastic elastomer which is partially crosslinked and the polyolefin resin (A) and the α-olefin copolymer rubber (B) in the specific amounts, and a reverse surface layer (II) containing a thermoplastic elastomer which is different from that of the skin layer (I) in content of both the polyolefin resin (A) and the α-olefin copolymer rubber (B), and the reverse surface layer (II) is not necessarily partially crosslinked.

In a preferred embodiment, the second two-layer thermoplastic elastomer sheet of the present invention includes a skin layer (I) which includes a mixture of 100 parts by weight of the partially crosslinked thermoplastic elastomer and 5 to 100 parts by weight of a polyolefin resin (E).

Examples of the polyolefin resins (A) include homopolymers of ethylene or propylene, and copolymers of ethylene or propylene with a small amount of other polymerizable monomer (e.g., propylene-ethylene copolymer, propylene-1-butene copolymer, propylene-1-hexene copolymer, propylene-4-methyl-1-pentene copolymer). As the above-mentioned other polymerizable monomers of a small amount, there can be mentioned vinyl acetate, ethyl acrylate and methacrylic acid. In the invention, the melt index (ASTM-D-1238-65T, 230° C.) of the polyolefin resin is preferably within the range of 0.1 to 100 g/10 min., more preferably 5 to 50 g/10 min.

As the polyolefin resin, a mixture of polyethylene (particularly, low-density polyethylene) and polypropylene having a mixing ratio of 10/90 to 70/30 (polyethylene/polypropylene) can be used for the purpose of enhancing forming properties (formability) and resistance to damage of the resulting sheet.

The α-olefin copolymer rubber (B) employable in the invention is an amorphous elastomeric copolymer containing olefin as a host component, such as ethylene-propylene copolymer rubber, propylene-ethylene copolymer rubber, ethylene-propylene non-conjugated diene copolymer rubber, propylene-ethylene non-conjugated diene copolymer rubber, ethylene-butadiene copolymer rubber and propylene-butadiene copolymer rubber. Further, the α-olefin copolymer rubber is a rubber which is reduced in flowability or loses flowability by crosslinking when it is mixed with organic peroxide and kneaded therewith under heating. The non-conjugated diene is a generic name for dicyclopentadiene, 1,4-hexadiene, dicycloctadiene, methylene norbornene, ethylidene norbornene, etc. Of these copolymer rubbers, ethylene-propylene non-conjugated diene copolymer rubber, particularly ethylene-propylene-ethylidenenorbornene copolymer rubber, is preferably used in the invention, because a thermoplastic elastomer molded product excellent in heat resistance, tensile characteristics and impact resilience can be obtained. The Mooney viscosity [$ML_{1+4}$(100° C.)] of the copolymer rubber is preferably in the range of 10 to 120, more preferably 40 to 80. In the case of using a copolymer rubber having Mooney viscosity of the above range, a thermoplastic elastomer product having high tensile characteristics can be obtained. The iodine value (degree of unsaturation) of the copolymer rubber is preferably not more than 16.

In the thermoplastic elastomer constituting the skin layer [I] of the first two-layer thermoplastic elastomer sheet of the invention, the polyolefin resin (A) is used in an amount of 1 to 85 parts by weight, preferably 20 to 80 parts by weight, more preferably 30 to 50 parts by weight, and the α-olefin copolymer rubber (B) is used in an amount of 99 to 15 parts by weight, preferably 80 to 20 parts by weight, more preferably 70 to 50 parts by weight, per 100 parts by weight of the sum of the polyolefin resin (A) and the α-olefin copolymer rubber (B).

In the thermoplastic elastomer constituting the reverse surface layer [II] of first two-layer thermoplastic elastomer sheet of the invention, the polyolefin resin (A) is used in an amount of 6 to 90 parts by weight, preferably 20 to 80 parts by weight, more preferably 30 to 50 parts by weight, and the α-olefin copolymer rubber (B) is used in an amount of 94 to 10 parts by weight, preferably 80 to 20 parts by weight, more preferably 70 to 50 parts by weight, per 100 parts by weight of the sum of the polyolefin resin (A) and the α-olefin copolymer rubber (B). The total amount of the polyolefin resin (A) and the α-olefin copolymer rubber (B) is 100 parts by weight. A difference [$(I_B)-(II_B)$] between the amount ($I_B$) of the α-olefin copolymer rubber (B) contained in the thermoplastic elastomer of the skin layer (I) and the amount ($II_B$) of the α-olefin copolymer rubber (B) contained in the thermoplastic elastomer of the reverse surface layer (II) is in the range of 5 to 85 parts by weight, preferably 10 to 70 parts by weight, more preferably 15 to 50 parts by weight.

When two kinds of the thermoplastic elastomers having a difference of the above range in the content of the α-olefin copolymer rubber (B) are used, a two-layer sheet having high vacuum forming properties and capable of producing a molded having an especially soft texture.

In the partially crosslinked thermoplastic elastomer constituting the skin layer (I) of the second thermoplastic elastomer sheet of the invention, the polyolefin resin (A) is used in an amount of 10 to 60 parts by weight, preferably 15 to 55 parts by weight, especially 20 to 50 parts by weight, and the α-olefin copolymer rubber (B) is used in an amount of 90 to 40 parts by weight, preferably 85 to 45 parts by weight, especially 80 to 50 parts by weight, per 100 parts by weight of the sum of the polyolefin resin (A) and the α-olefin copolymer rubber (B).

In the thermoplastic elastomer constituting the reverse surface layer (II) of the second thermoplastic elastomer sheet of the invention, the polyolefin resin (A) is used in an amount of 20 to 70 parts by weight, preferably 25 to 65 parts by weight, especially 30 to 60 parts by weight, and the α-olefin copolymer rubber (B) is used in an amount of 80 to 30 parts by weight, preferably 75 to 35 parts by weight, especially 70 to 40 parts by weight, per 100 parts by weight of the sum of the polyolefin resin (A) and the α-olefin copolymer rubber (B).

As mentioned above, in the second thermoplastic elastomer sheet of the present invention, the skin layer (I) may include the blend obtained by blending the above partially crosslinked thermoplastic elastomer and a polyolefin resin (E) at the specified ratio. Examples of the polyolefin resin (E) include the same copolymers as those exemplified for the polyolefin resin (B). In the invention, the melt index (ASTM-D-1238-65T, 230° C.) of the polyolefin resin is preferably 0.4 to 20 g/min.

The polyolefin resin (E) is used in an amount of 5 to 100 parts by weight, preferably 20 to 80 parts by weight, per 100 parts by weight of the partially crosslinked thermoplastic elastomer, of the skin layer (I).

In a preferred embodiment of the second thermoplastic elastomer sheet of the present invention, there is a difference $(I_B)-(II_B)$ between the amount ($I_B$) of the α-olefin copolymer rubber (B) contained in the thermoplastic elastomer of the skin layer (I) and the amount ($II_B$) of the α-olefin copolymer rubber (B) contained in the thermoplastic elastomer of the reverse surface layer (II). The difference is in the range of 5 to 85 parts by weight, preferably 10 to 70 parts by weight, more preferably 15 to 50 parts by weight.

When two different kinds of thermoplastic elastomers having a difference in content of the α-olefin copolymer rubber are used, there can be obtained a two-layer sheet having high vacuum forming properties and capable of producing a molded product having an especially soft texture.

In the first thermoplastic elastomer sheet of the present invention, the olefin thermoplastic elastomers used for the skin layer (I) and the reverse surface layer (II) may or may not be partially crosslinked. However, it is preferred that at least the olefin thermoplastic elastomer of the skin layer (I) is partially crosslinked.

In the second thermoplastic elastomer sheet of the present invention, partial crosslinking of the olefin thermoplastic elastomer for the skin layer (I) is essential but the reverse surface layer (II) may or may not be partially crosslinked.

The partially crosslinked thermoplastic elastomer can be obtained, for example, by dynamically heat-treating a blend of the above-mentioned components in the presence of an organic peroxide. The blend of the partially crosslinked thermoplastic elastomer and the polyolefin resin (E), which may be used for the skin layer (I) of the second thermoplastic elastomer sheet, is obtained by dynamically heat-treating a blend of the components.

The non-crosslinked thermoplastic elastomer, which may be used in the reverse surface layer (II) of the second thermoplastic elastomer sheet can be obtained by dynamically heat-treating the blend of the above-mentioned components.

The expression "dynamically heat-treating a blend" as used herein means that a blend is kneaded in the molten state of dissolution.

In the present invention, the thermoplastic elastomers of the skin layer [I] and the reverse surface layer [II] constituting a two-layer sheet may contain a peroxide non-crosslinkable hydrocarbon gum rubber (C) and/or a mineral oil softening agent (D) in addition to the polyolefin resin (A) and the α-olefin copolymer rubber (B).

The peroxide non-crosslinkable hydrocarbon gum rubber (C) employable in the invention is a gum rubber of hydrocarbon type which is not crosslinked and is not reduced in flowability even when it is mixed with peroxide and kneaded therewith under heating. Examples of the gum rubber include polyisobutylene, butyl rubber (IIR), propylene-ethylene copolymer rubber having a propylene content of not less than 70% by mole, and atactic polypropylene. Of these, polyisobutylene and butyl rubber are most preferred because of good performance and easy handling.

The peroxide non-crosslinkable hydrocarbon gum rubber (C) improves flowability of a thermoplastic elastomer composition. Preferably a peroxide non-crosslinkable hydrocarbon gum rubber having a Mooney viscosity [$ML_{1+4}$(100° C.)] of not more than 60 is used.

The peroxide non-crosslinkable hydrocarbon gum rubber (C) is used in the invention in an amount of 5 to 100 parts by weight, preferably 10 to 50 parts by weight, more preferably 15 to 40 parts by weight, per 100 parts by weight of the sum of the polyolefin resin (A) and the α-olefin copolymer rubber (B).

The mineral oil softening agent (D) employable in the invention is a high-boiling petroleum cut which is generally used for mitigating the intermolecular force of the rubber to facilitate processing of rubber in the rolling processing procedure, assisting dispersibility of carbon black, white carbon, etc. added as a filler, or reducing rigidness of vulcanized rubber to increase flexibility and elasticity thereof. The mineral oil softening agent is classified into paraffin type, naphthene type, aromatic type, etc.

A molded product obtained from a thermoplastic elastomer composition containing the naphthene type mineral oil softening agent shows less surface tackiness as compared with a molded product obtained from a thermoplastic elastomer composition containing paraffin type mineral oil softening agent, so that the naphthene type mineral oil softening agent is more preferably used in the invention than the paraffin type mineral oil softening agent.

In the invention, the mineral oil softening agent (D) is used in an amount of 5 to 100 parts by weight, preferably 10 to 80 parts by weight, more preferably 20 to 70 parts by weight, per 100 parts by weight of the sum of the polyolefin resin (A) and the α-olefin copolymer rubber (B).

The two-layer thermoplastic elastomer sheet of the invention may contain other additives, provided that the addition of the additives does not mar the object of the invention. Examples of the additives include polyolefin plastics such as high-density polyethylene, intermediate density polyethylene, low-density polyethylene, isotactic polypropylene and propylene-α-olefin copolymer; inorganic fillers such as calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass bulb and shirasu balloon; and colorants such as carbon black, titanium oxide, zinc white, blood red, ultramarine blue, Milori blue, azo pigment, nitroso pigment, lake pigment and phthalocyanine pigment.

Further, in the two-layer thermoplastic elastomer sheet of the invention there may be used known heat stabilizers such as heat stabilizers of phenol type, sulfite type, phenylalkane type, phosphite type and amine type, aging-inhibiting agent, weathering stabilizer, antistatic agent, metallic soap, and lubricant such as wax. They can be added in such an amount as generally used for conventional polyolefin resins or α-olefin copolymer rubbers.

If a light stabilizer such as ultraviolet absorbing agent, light absorbing agent and hindered amines is added to the thermoplastic elastomer constituting the skin layer [I] of the two-layer thermoplastic elastomer sheet of the invention and a flame-retardant are added to the thermoplastic elastomer constituting the reverse surface layer [II] thereof, there can be obtained a two-layer thermoplastic elastomer sheet capable of providing a molded product which is excellent in light resistance and flame retardance and free from occurrence of bleedout that causes marked deterioration in merchandise value.

However, if the light stabilizer and the flame-retardant are together added to and allowed to present in the same thermoplastic elastomer according to the prior art, occurrence of bleedout could not be prevented.

There is no specific limitation on the light stabilizer and the flame-retardant employable in the invention, provided that they are generally used for conventional polyolefin thermoplastic elastomers.

Concrete examples of the light stabilizers preferably used in the invention include antioxidants of hindered phenol type represented by pentaerythritol-tetrakis [3-(3,5-di-t-butyl-4-hydroxyphenyl)propionate] and octadecyl-3-(3,5-di-t-butyl-4-hydroxyphenyl)propionate; and light stabilizers of hindered amine type represented by bis(2,2,6,6-tetramethyl-4-piperidyl) sebacate.

In the case of using the above-mentioned light stabilizers of hindered amine type, light stabilizers of benzotriazole type represented by 2-(3t-butyl-5-methyl-2-hydroxyphenyl)-5-chlorobenzotriazole can be employed in combination. The antioxidants of hindered phenol type and the light stabilizers of hindered amine type may be used singly or in combination.

The amount of the light stabilizer used in the invention is generally in the range of 0.01 to 0.3 phr, preferably 0.05 to 0.2 phr.

Concrete examples of the flame-retardants preferably used in the invention include inorganic flame-retardants represented by antimony oxide and aluminum hydroxide; and halogen type flame-retardants represented by decabromodiphenyl ether ad chlorinated polyethylene.

The organic flame-retardant and the halogen type flame-retardant can be employed singly or in combination.

When the inorganic flame-retardant is used, the amount of the flame-retardant used in the invention is generally in the range of 10 to 200 phr, preferably 5 to 150 phr. When the halogen type flame-retardant is used, the amount of the flame-retardant used is generally in the range of 10 to 100 phr, preferably 25 to 55 phr.

Concrete examples of organic peroxides employable for preparing the thermoplastic elastomer the invention include dicumyl peroxide, di-tert-butylperoxide, 2,5-dimethyl-2,5-di-(tert-butylperoxy)hexane, 2,5-dimethyl-2,5-di(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperbenzoate, tert-butylperoxyisopropyl carbonate, diacetyl peroxide, lauroyl peroxide and tert-butylcumyl peroxide.

Of these, form the viewpoints of odor development and scorching stability, preferred are 2,5-dimethyl-2,5-di(tert-butylperoxy)hexane, 2,5-dimethyl-2,5-di(tert-butylperoxy)hexine-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate, and most preferred is 1,3-bis(tert-butylperoxyisopropyl)benzene.

The amount of the organic peroxide used in the invention generally is in the range of 0.05 to 3% by weight, preferably 0.1 to 1% by weight, more preferably 0.1 to 0.5% by weight, based on the total amount of the above-mentioned components (A), (B) and (C). When the amount of the organic peroxide is within the above range, the obtained thermoplastic elastomer becomes excellent in properties required for rubbers such as heat resistance, tensile characteristics, elastic recovery and impact resilience as well as excellent in strength and formability.

As the kneading apparatus, an extruder is used in the invention. Particularly, an unopened extruder is preferably used. Kneading is preferably carried out in an atmosphere of inert gas such as nitrogen or carbonic acid gas. In the invention, kneading is carried out at such a temperature that the half-life of the organic peroxide used becomes shorter than 1 minute (generally at a temperature of 150° to 280° C., preferably 170° to 240° C.), for 1 to 20 minutes, preferably 1 to 10 minutes. The shearing force applied in the kneading procedure is in the range of 10 to $10^4 \text{ sec}^{-1}$, preferably $10^2$ to $10^3 \text{ sec}^{-1}$, in terms of a shear rate.

In the aforementioned partially crosslinking processing using the organic peroxide in the invention, there can be added crosslinking assistants such as sulfur, p-quinonedioxime, p,p'-dibenzoylquinonedioxime, N-methyl-N,4-dinitrosoaniline, nitrobenzene, diphenyl guanidine and trimethylolpropane-N,N'-m-phenylenedimaleimide; polyfunctional methacrylate monomers such as divinyl benzene, triallyl cyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers such as vinyl butyrate and vinyl stearate. By the use of these compounds, homogeneous and moderate crosslinking reaction can be expected. Of these compounds, divinyl benzene is most preferably used in the invention, because it can be easily handled and is compatible with the $\alpha$-olefin copolymer rubber and the polyolefin resin which are main components of the blend to be treated. Further, divinyl benzene has solvency action for the organic peroxide and serves as a dispersing assistant of the peroxide, so that a composition having homogeneous crosslinking effect and good balance between flowability and physical properties can be obtained. In the invention, the crosslinking assistant or the polyfunctional vinyl monomer is used in an amount of 0.1 to 2% by weight, preferably 0.3 to 1% by weight, based on the total amount of the blend to be treated. When they are used in such amount, a composition which shows high flowability and brings about no change in physical properties due to heating history in the molding procedure is obtained.

Decomposition accelerators such as tertiary amines (e.g., triethylamine, tributylamine and 2,4,6-tris(dimethylamino)phenol) and naphthenic acid salts (e.g., aluminum, cobalt, vanadium, copper, calcium, zirconium, manganese, magnesium, lead and mercury) can be used to accelerate decomposition of the organic peroxide.

As described above, the thermoplastic elastomer is partially crosslinked when it is dynamically heat-treated in the presence of the organic peroxide.

As used herein, the expression "the thermoplastic elastomer is partially crosslinked" means that the gel content measured by the following method is not less than 20%, preferably in the range of 20 to 99.5%, more preferably 45 to 98%.

Measurement of Gel Content 100 mg of a specimen of the thermoplastic elastomer is weighed out, and it is cut into pieces having a size of 0.5 mm×0.5 mm×0.5 mm. The pieces of the specimen are immersed in 30 ml of cyclohexane at 23° C. for 48 hours in a sealed container, then the residue is taken out of the container onto a filter paper, and dried at room temperature for 72 hours until the weight of the specimen becomes constant.

From the weight of the dried residue are subtracted the total weight of the cyclohexane-insoluble components (fibrous filler, filler, pigment, etc.) other than the polymer component and the weight of the polyolefin resin component contained in the specimen before immersing in cyclohexane, and the obtained value is "compensated final weight (Y)".

On the other hand, the weight of the α-olefin copolymer rubber contained in the specimen, namely, the value obtained by subtracting the weight of the cyclohexane-soluble component 1 (e.g., mineral oil and plasticizer) other than the α-olefin copolymer rubber, the weight of the polyolefin resin component 2 and the weight of the cyclohexane-insoluble component 3 (e.g., fibrous filler, filler and pigment) other than the polymer component from the weight of the specimen, is "compensated initial weight (X)".

The gel content is determined by the following formula:

$$\text{Gel content (wt. \%)} = \frac{\text{Compensated final weight } (Y)}{\text{Compensated initial weight } (X)} \times 100$$

In the present invention, the light stabilizers and the flame-retardants are added at any steps, constituting the process for producing the thermoplastic elastomer composition. However, it is preferred that the flame-retardant is added to the thermoplastic elastomer by using an extruder or Banbury mixer intermettently or with an elapse of time after the dynamic heat-treatment in the presence of the organic peroxide.

In the invention, the skin layer [I] composed of the thermoplastic elastomer constitutes a skin layer of a vacuum forming molded product. The thickness of the skin layer [I] constituting a skin layer of the vacuum forming molded product is generally in the range of 0.01 to 50 mm, preferably 0.10 to 20 mm, while the thickness of the other layer [II] constituting the inner layer of the vacuum forming molded product is generally in the range of 0.01 to 100 mm, preferably 0.10 to 50 mm.

The two-layer thermoplastic elastomer sheets of the invention can be obtained by fusing the above-mentioned two types of thermoplastic elastomers to each other utilizing, for example, a conventionally known extrusion laminating method or injection molding method.

The two-layer thermoplastic elastomer sheets of the invention also can be obtained by fusing two kinds of sheets having been beforehand molded, which constitutes the skin layer [I] and the reverse surface layer [II] of the two-layer sheet, at a temperature not lower than the temperature at which at least one of the two sheets is melted using a calender roll molding machine, a compression molding machine, etc.

Further, the two-layer thermoplastic elastomer sheets of the invention also can be obtained by fusing a previously molded sheet which constitutes the skin layer [I] or the reverse surface layer [II] of the two-layer sheet to a sheet which constitutes the reverse surface layer [II] or the skin layer [I] of the two-layer sheet at the time when the latter sheet is prepared by extrusion molding or calendering.

The two-layer thermoplastic elastomer sheet of the invention is generally subjected to vacuum forming with other core materials to produce to molded product having a particularly soft texture.

Effect of the Invention

The first and second two-layer thermoplastic elastomer sheets of the invention are excellent in vacuum forming properties and can provide a molded product having an excellent soft texture and sufficiently low surface glossiness.

Further, the two-layer thermoplastic elastomer sheets of the invention also exhibit softness, flexibility and warmth in its appearance.

The two-layer thermoplastic elastomer sheets of the invention having the above-mentioned effects can be widely employed for various interior automotive trim such as instrument panel.

The present invention is further described by the following examples, but the examples are given by no means to restrict the invention.

At first, methods for evaluating vacuum forming properties (formability), the softness and surface glossiness of two-layer thermoplastic elastomer sheets obtained by an example and comparative examples and single-layer sheets produced using the components of the two-layer sheets are described below.

Evaluation Method (1) Evaluation of vacuum forming properties (formability)

The sheet is subjected to vacuum forming using a drape forming mold until the extensibility of the sheet becomes 250% and 400%, and then occurrence of sheet break is observed.

Condition of drape forming: upper and lower heaters are operated so that the surface temperature of the sheet is 150° C.

(2) Evaluation of softness

The surface of the vacuum forming molded product is touched with fingers, and the touch is classified into 5 levels.
5: very soft
4: soft
3: normal
2: hard
1: very hard (3) Evaluation of Surface Glossiness The surface gloss value of the vacuum forming molded products is evaluated according to JIS-Z-8741, in which gloss is measured with light having 60° of incident angle and the resulting surface gloss value is classified into 5 levels. One of the objects of the present invention is to obtain molded products having low surface glossiness. Accordingly, a lower surface gloss value indicates a superior molded article.
5: glossiness is less than 4%
4: glossiness is not less than 4% but is less than 8%
3: glossiness is not less than 8% but is less than 12%
2: glossiness is less than 12% but is less than 16%
1: glossiness is not less than 16%;

EXAMPLE 1

Pelletts of two kinds of thermoplastic elastomers (referred to hereinafter as TPE (I) and TPE (II) were prepared as follows.

Preparation of Pellet of TPE (I)

37 parts by weight of an isotactic polypropylene resin (i) [melt flow rate: 13 g/10 min (230° C.)], 63 parts by weight of an ethylene-propylene-ethylidenenorbornene terpolymer rubber (ii) [ethylene unit/propylene unit (molar ratio): 78/22, iodine value: 15, Mooney viscosity $ML_{1+4}$ (121° C.): 61], and 30 parts by weight of a naphthene type process oil (iii) were kneaded at 180° C. for 5 minutes in a nitrogen atmosphere using a Banbury mixer. Then, the obtained kneadate was cut into angular pellets using a sheet cutter.

Thereafter, with 100 parts by weight of the angular pellets was kneaded 1 part by weight of a mixture (iv) of 20 wt.% of 1,3-bis(tert-butylperoxyisopropyl)benzene, 30 wt.% of divinyl benzene and 50 wt.% of a paraffin mineral oil in a Henschel mixer. Then, the obtained kneadate was extruded at 220° C. in a nitrogen atmosphere using an extruder, to prepare pellets of a thermoplastic elastomer [TPE (1)]. The gel content of [TPE (1)] was 92% by weight.

Preparation of Pellet of TPE (II)

The above procedure for preparing the pellets of TPE (I) was repeated except for using the isotactic polypropylene resin (i) in an amount of 50 parts by weight and the ethylene-propylene-ethylidenenorbornene terpolymer rubber (ii) in an amount of 50 parts by weight, to prepare pellets of a thermoplastic elastomer [TPE (II)]. The gel content of [TPE (II)] was 89% by weight.

Then, a skin layer sheet of a two-layer sheet was prepared from the above pellets of TPE (I) in the following manner.

Preparation of TPE (I) sheet

The pellets of TPE (I) were melted at 220° C. and subjected to calendering using a calendering molding machine (produced by NIPPON Roll, Co., Ltd.), to obtain a thermoplastic elastomer [TPE (I)] sheet having a thickness of 0.3 mm.

Preparation of Two-Layer Sheet

The pellets of TPE (II) were melted at 220° C., and the obtained molten TPE (II) was coated on the reverse surface of the above TPE (I) sheet using a calendering molding machine (produced by NIPPON Roll, Co., Ltd.), to obtain a two-layer thermoplastic elastomer sheet having a thickness of 0.9 mm.

The obtained two-layer thermoplastic elastomer sheet was evaluated for vacuum forming properties and the softness according to the aforementioned evaluation methods.

The results are set forth in Table 1.

Comparative Example 1

A thermoplastic elastomer [TPE (I)] sheet having a thickness of 9 mm was prepared in the same manner as that for preparing the TPE (I) sheet in Example 1.

The thus prepared sheet was evaluated for vacuum forming properties and softness according to the aforementioned evaluation methods.

The results are set forth in Table 1.

Comparative Example 2

The procedure for preparing the TPE (I) sheet in Example 1 were repeated except that pellets of TPE (II) was used instead of the pellets of TPE (I), to prepare a thermoplastic elastomer [TPE (II)] sheet having a thickness of 0.9 mm.

The thus prepared sheet was evaluated for vacuum forming properties and softness according to the aforementioned evaluation methods.

The results are set forth in Table 1.

Comparative Example 3

Preparation of Pellet of TPE (III)

The procedure for preparing the pellets of TPE (I) in Example 1 was repeated except for using the isotactic polypropylene resin (i) in an amount of 10 parts by weight and the ethylene-propylene-ethylidenenorbornene terpolymer rubber (ii) in an amount of 90 parts by weight, to prepare pellets of a thermoplastic elastomer [TPE (III)].

Preparation of Pellet of TPE (IV)

The procedure for preparing the pellets of TPE (I) in Example 1 was repeated except for using the isotactic polypropylene resin (i) in an amount of 97 parts by weight and the ethylene-propylene-ethylidenenorbornene terpolymer rubber (ii) in an amount of 3 parts by weight, to prepare pellets of a thermoplastic elastomer [TPE (IV)].

Then, a skin layer sheet of a two-layer sheet was prepared from the above pellets of TPE (III) in the following manner.

Preparation of TPE (III) sheet

The pellets of TPE (III) were melted at 220° C. and subjected to calendering using a calendering molding machine (produced by NIPPON Roll, Co., Ltd.), to obtain a thermoplastic elastomer [TPE (III)] sheet having a thickness of 0.3 mm.

Preparation of Two-layer Sheet

The pellets of TPE (IV) were melted at 220° C., and the obtained molten TPE (IV) was coated on the reverse surface of the above TPE (III) sheet using a calendering molding machine (produced by NIPPON Roll, Co., Ltd.), to obtain a two-layer thermoplastic elastomer sheet having a thickness of 0.9 mm.

The obtained two-layer thermoplastic elastomer sheet was evaluated for vacuum forming properties and softness according to the aforementioned evaluation methods.

The results are set forth in Table 1.

Comparative Example 4

Preparation of Pellet of TPE (V)

The procedure for preparing the pellets of TPE (I) in Example 1 was repeated except for using the isotactic polypropylene resin (i) in an amount of 40 parts by weight and the ethylene-propylene-ethylidenenorbornene terpolymer rubber (ii) in an amount of 60 parts by weight, to prepare pellets of a thermoplastic elastomer [TPE (V)].

Preparation of Two-layer Sheet

The pellets of TPE (V) were melted at 220° C., and the obtained molten TPE (V) was coated on the reverse surface of the TPE (I) sheet of Example 1 using a calendering molding machine (produced by NIPPON Roll, Co., Ltd.), to obtain a two-layer thermoplastic elastomer sheet having a thickness of 0.9 mm.

The obtained two-layer thermoplastic elastomer sheet was evaluated for vacuum forming properties and softness according to the aforementioned evaluation methods.

The results are set forth in Table 1.

TABLE 1

|  | Ex. 1 | Com. Ex. 1 | Com. Ex. 2 | Com. Ex. 3 | Com. Ex. 4 |
|---|---|---|---|---|---|
| Structure of vacuum forming molded product | skin layer of TPE (I), reverse surface layer of TPE (II) | single layer of TPE (I) | single layer of TPE (II) | skin layer of TPE (III), reverse surface layer of TPE (IV) | skin layer of TPE (I), reverse surface layer of TPE (V) |
| Difference of rubber content [part by weight] | 13 | — | — | 87 | 3 |
| Vacuum forming properties | | | | | |
| Extensibility of 250% | break is not observed | break is not observed | break is not observed | break is observed | break is not observed |
| Extensibility of 400% | break is not observed | break is observed | break is not observed | break is observed | break is observed |
| Softness | | | | | |
| Extensibility of 250% | 5 | 5 | 3 | 5 | 5 |
| Extensibility of 400% | 5 | 5 | 3 | 5 | 5 |

Note: Difference of rubber content in Table 1 is obtained by the following formula: [(rubber content of skin layer) − (rubber content of reverse surface layer)].

EXAMPLE 2

Pellets having one of two types of thermoplastic elastomers (referred to hereinafter as TPE (III) and TPE (IV)) were prepared as follows.

Preparation of Pellets of TPE (III)

The pellets of TPE (III) were prepared in the same manner as for the preparation of pellets of TPE (I) in Example 1 except that 35 parts by weight of isotactic polypropylene resin (i) and 65 parts by weight of ethylene-propylene-ethylidenenorbornene terpolymer rubber (ii) and 30 parts by weight of naphthene type process oil (iii) were used to obtain the angular pellets. The resulting pellets TPE (III) had a gel content of 92% by weight.

Preparation of Pellets of TPE (IV)

Angular pellets were prepared in the same manner as in the preparation of pellets of TPE (I) except that 45 parts by weight of isotactic polypropylene resin (i) and 55 parts by weight of ethylene-propylene-ethylidenenorbornene terpolymer rubber (ii) and 30 parts by weight of naphthene type process oil (iii) were used.

Thereafter, the angular pellets were kneaded at 220° C. in a nitrogen atmosphere using an extruder to prepare the pellets of TPE (IV). The pellets of TPE (IV) had a gel content of 8% by weight.

Preparation of TPE (III) Sheet

A skin layer sheet of a two-layer sheet was prepared from the pellets of TPE (III) in the same manner as in Example 1.

Preparation of Two-layer Sheet

A two-layer sheet was prepared in the same manner as in Example 1 except that the skin layer sheet made of TPE (III) was coated with molten TPE (IV).

The obtained two-layer thermoplastic elastomer sheet was evaluated for vacuum forming properties and surface glossiness according to the aforementioned evaluation methods.

The results are set forth in Table 2.

EXAMPLE 3

A thermoplastic elastomer sheet 0.3 mm thick was prepared in the same manner as that for preparing the TPE (III) sheet in Example 2 except that there were used 70 parts by weight of the pellets of TPE (III) and 30 parts by weight of low density polyethylene obtained by a low pressure method (density: 0.920 g/cm³, melt flow rate: 2.1 g/10 sec., hereinafter referred to as PE (I)). Then, the resulting thermoplastic elastomer sheet was used to prepare a two layer thermoplastic elastomer sheet having a thickness of 0.9 mm by the same manner as in Example 2.

The obtained two-layer thermoplastic elastomer sheet was evaluated for vacuum forming properties and surface glossiness according to the aforementioned evaluation methods.

The results are set forth in Table 2.

Comparative Example 5

A thermoplastic elastomer [TPE (III)] sheet having a thickness of 0.9 mm was prepared in the same manner as that for preparing the TPE (III) sheet in Example 2.

The obtained sheet was evaluated for vacuum forming properties and surface glossiness according to the aforementioned evaluation methods.

The results are set forth in Table 2.

Comparative Example 6

A thermoplastic elastomer [TPE (IV)] sheet having a thickness of 0.9 mm was prepared in the same manner as that for preparing the TPE (III) sheet in Example 2 except that pellets of TPE (IV) were used in place of pellets of TPE (III).

The obtained sheet was evaluated for vacuum forming properties and surface glossiness according to the aforementioned evaluation methods.

The results are set forth in Table 2.

Comparative Example 7

A thermoplastic elastomer sheet having a thickness of 0.9 mm was prepared in the same manner as that for preparing the TPE (III) sheet in Example 2 except that 70 parts by weight of pellets of TPE (IV) and 30 parts by weight of pellets PE (I) were used in place of 100 parts by weight of pellets of TPE (III).

The obtained sheet was evaluated for vacuum forming properties and surface glossiness according to the aforementioned evaluation methods.

The results are set forth in Table 2.

TABLE 2

|  | Ex. 2 | Ex. 3 | Com. Ex. 5 | Com. Ex. 6 | Com. Ex. 7 |
|---|---|---|---|---|---|
| Structure of vacuum forming product | skin layer of TPE (III) reverse surface layer of TPE (IV) | skin layer of TPE (III) & PE (I) reverse surface layer of TPE (IV) | single layer of TPE (III) | single layer of TPE (IV) | single layer of TPE (III) & PE (I) |
| Vacuum forming properties |  |  |  |  |  |
| Extensibility of 250% | Break is not observed. | Break is not observed. | Break is observed. | Break is not observed. | Break is not observed. |
| Extensibility of 400% | Break is not observed. | Break is not observed. | Break is observed. | Break is not observed. | Break is observed. |
| glossiness | 5 | 4 | 5 | 2 | 4 |

Note: In each of the Examples 3 and Comparative Example 7, TPE (III) and PE (I) were used in amounts of 70 parts by weight and 30 parts by weight, respectively.

We claim:

1. A two-layer thermoplastic elastomer sheet comprising a skin layer (I) and a reverse surface layer (II), wherein:
   said skin layer (I) comprises a partially crosslinked thermoplastic elastomer comprising a polyolefin resin (A) in an amount of 20 to 50 parts by weight and an α-olefin copolymer rubber (B) in an amount of 80 to 50 parts by weight, the total amount of (A) and (B) being 100 parts by weight;
   said reverse surface layer (II) comprises a thermoplastic elastomer comprising a polyolefin resin (A) in an amount 30 to 60 parts by weight and an α-olefin copolymer rubber (B) in an amount of 70 to 40 parts by weight, the total amount of (A) and (B) being 100 parts by weight; and
   a difference (($I_B$)−($II_B$)) between the amount ($I_B$) of the α-olefin copolymer rubber (B) contained in the thermoplastic elastomer of the skin layer (I) and the amount ($II_B$) of the α-olefin copolymer rubber (B) contained in the thermoplastic elastomer of the reverse surface layer (II) is in the range of 15 to 50 parts by weight.

2. The two-layer thermoplastic elastomer sheet according to claim 1, wherein the skin layer (I) further comprises from about 5 to about 100 parts by weight of a polyolefin resin (E).

3. A two-layer thermoplastic elastomer sheet comprising a skin layer (I) and a reverse surface layer (II), wherein:
   said skin layer (I) comprises a partially crosslinked thermoplastic elastomer comprising a polyolefin resin (A) in an amount of from 20 to 50 parts by weight and an α-olefin copolymer rubber (B) in an amount of from 80 to 50 parts by weight, the total amount of (A) and (B) being 100 parts by weight;
   said reverse surface layer (II) comprises a partially crosslinked thermoplastic elastomer comprising a polyolefin resin (A) in an amount of from 30 to 60 parts by weight and an α-olefin copolymer rubber (B) is an amount of from 70 to 40 parts by weight, the total amount of (A) and (B) being 100 parts by weight; and
   a difference (($I_B$)−($II_B$)) between the amount ($I_B$) of the α-olefin copolymer rubber (B) contained in the thermoplastic elastomer of the skin layer (I) and the amount ($II_B$) of the α-olefin copolymer rubber (B) contained in the thermoplastic elastomer of the reverse surface layer (II) is in the range of from 15 to 50 parts by weight.

4. The two-layer thermoplastic elastomer sheet according to claim 3, wherein the thermoplastic elastomer of the skin layer (I) further comprises at least one of (C) a peroxide non-crosslinkable hydrocarbon gum rubber and (D) a mineral oil softening oil.

5. The two-layer thermoplastic elastomer sheet according to claim 4, wherein the thermoplastic elastomer of the reverse surface layer (II) further comprises at least one of (C) a peroxide non-crosslinkable hydrocarbon gum rubber and (D) a mineral oil softening agent.

6. The two-layer thermoplastic elastomer sheet according to claim 5, wherein the skin layer further comprises a light stabilizer and the reverse surface layer (II) further comprises a flame retardant.

7. The two-layer thermoplastic elastomer sheet according to claim 4, wherein the skin layer further comprises a light stabilizer and the reverse surface layer (II) further comprises a flame retardant.

8. The two-layer thermoplastic elastomer sheet according to claim 4, wherein the peroxide non-crosslinkable hydrocarbon gum rubber is present and is polyisobutylene or butyl rubber.

9. The two-layer thermoplastic elastomer sheet according to claim 4, wherein the peroxide non-crosslinkable hydrocarbon gum rubber is present and has a Mooney Viscosity ($ML_{114}$ (100° C.)) of not more than 60.

10. The two-layer thermoplastic elastomer sheet according to claim 4, wherein the peroxide non-crosslinkable hydrocarbon gum rubber is present in an amount of 15 to 40 parts by weight per 100 parts by weight of the sum of the polyolefin resin (A) and the α-olefin copolymer rubber (B).

11. The two-layer thermoplastic elastomer sheet according to claim 4, wherein the mineral oil softening agent is present in an amount of 20 to 70 parts by weight per 100 parts by weight of the sum of the polyolefin resin (A) and the α-olefin copolymer rubber (B).

12. The two-layer thermoplastic elastomer sheet according to claim 3, wherein the thermoplastic elastomer of the reverse surface layer (II) further comprises at least one of (C) a peroxide non-crosslinkable hydrocarbon gum rubber and (D) a mineral oil softening agent.

13. The two-layer thermoplastic elastomer sheet according to claim 12, wherein the skin layer comprises a light stabilizer and the reverse surface layer (II) further comprises a flame retardant.

14. The two-layer thermoplastic elastomer sheet according to claim 3, wherein the skin layer further comprises a light stabilizer and the reverse surface layer (II) further comprises a flame retardant.

15. The two-layer thermoplastic elastomer sheet according to claim 3, wherein the skin layer (I) further comprises from about 5 to about 100 parts by weight of a polyolefin resin (E).

16. The two-layer thermoplastic elastomer sheet according to claim 3, wherein the thermoplastic elastomer in skin layer (I) comprises polyolefin resin (A) in an amount of 30 to 50 parts by weight and the α-olefin copolymer rubber (B) in amount of 70 to 50 parts by weight; and the thermoplastic elastomer in skin layer (I) comprises polyolefin resin (A) in an amount of 30 to 50 parts by weight and α-olefin copolymer rubber (B) in an amount of 70 to 50 parts by weight.

17. A two-layer thermoplastic elastomer sheet comprising a skin layer (I) and a reverse layer (II), wherein:

said skin layer (I) comprises a non-crosslinked thermoplastic elastomer comprising a polyolefin resin (A) in an amount of parts by weight and an α-olefin copolymer rubber (B) in an amount of parts by weight, the total amount of (A) and (B) being 100 parts by weight;

said reverse surface layer (II) comprises a thermoplastic elastomer comprising a polyolefin resin (A) in an amount parts by weight and an α-olefin copolymer rubber (B) in an amount of parts by weight, the total amount of (A) and (B) being 100 parts by weight; and a difference $((I_B)-(II_B))$ between the amount $(I_B)$ of the α-olefin copolymer rubber (B) contained in the thermoplastic elastomer of the skin layer (I) and the amount $(II_B)$ of the α-olefin copolymer rubber (B) contained in the thermoplastic elastomer of the reverse surface layer (II) is in the range of parts by weight.

* * * * *